United States Patent Office 2,965,553
Patented Dec. 20, 1960

2,965,553

CURING OF HIGH MOLECULAR WEIGHT POLYMERS

Stanley Dixon and Earl J. Goldberg, Wilmington, Del., assignors to E. I. du Pont de Nemours and Company, Wilmington, Del., a corporation of Delaware No Drawing. Filed May 25, 1956, Ser. No. 587,211

8 Claims. (Cl. 204—154)

This invention is directed to a process for the curing, by radiation, of high molecular weight polymers compounded with a free radical acceptor.

Convenient sources of the required high energy radiation for the present invention are Cobalt 60, atomic pile waste materials and radiations furnished by a Van der Graaf accelerator.

It has been discovered that high molecular weight polymers may be effectively cured by incorporating a free radical acceptor followed by treatment with ionizing radiation to yield a cured polymer reflecting significant and advantageous improved properties. It has been found, for example, that ethylene homopolymers, copolymers of ethylene and propylene, fluoroelastomers—such as copolymers of vinylidene fluoride and hexafluoropropylene-sulfo-chlorinated polyethylenes, vinylidene fluoride/chlorotrifluoroethylene copolymer, cellulose acetate, polybutyl isobutyl methacrylate, polyvinyl chloride, vinyl chloride/vinyl acetate copolymers, diphenylol propane/di-beta-chloroethyl ether copolymer, ethyl cellulose polyvinyl formal, polyvinyl acetal, polyurethanes, polystyrene, polyacetals, polyvinyl acetate and polyvinyl alcohols may be unexpectedly altered in physical properties by the process of compounding in said polymer from 0.5 to about 6% by weight of the polymer of a free radical acceptor and then subjecting said compounded polymer to ionizing radiation.

It is an object of the present invention to improve the physical properties of high molecular weight polymers by utilizing a free radical acceptor and ionizing radiation to effect a cure.

More specifically, the present invention is directed to a process for curing high molecular weight polymers, said process comprising compounding in the polymer from about 0.5 to about 6% by weight of the polymer of a free radical acceptor selected from the group consisting of N-substituted maleimides, N,N'-substituted-bis-maleimides and bis-acrylamides, and cyclic tris-acrylamide followed by subjecting the compounded polymer to ionizing radiation.

The polymers which are cured according to the process of the present invention include both saturated and unsaturated substantially high molecular weight polymers. The polyethylene polymers used by the process of this invention are prepared in the general way as disclosed in U.S. Patent 2,153,553; the sulfo-chlorinated polyethylenes are generally prepared by the process described in U.S. Patent 2,416,061; the vinylidene fluoride and hexafluoropropylene copolymer is prepared as described in U.S. Serial No. 504,351 in the name of Rexford and now abandoned; the vinylidene fluoride and chlorotrifluoroethylene copolymers are available under the name of Kel-F elastomers and are disclosed in "Rubber Age," vol. 76 (January 1955), pages 543–550. The polyurethane polymers may be prepared by the reaction of polymeric glycols, organic diisocyanates and chain-extending agents or by reacting bis-chloro formates of the polymeric glycols with organic diamines. It is to be understood that while these polyurethane polymers are substantially free of intra-linear C=C unsaturation, they may contain unsaturated side chain groups. Polyurethane polymers prepared from polyalkylene ether glycols are described in U.S. Patent 2,734,045; polyurethane polymers prepared from polyalkylene arylene ether glycols are described in copending application Serial No. 485,288 of Benning et al. and now U.S. Patent No. 2,843,568, and polyurethane polymers prepared from polyester glycols are described in U.S. Patent 2,621,166. The polyamide polymers prepared in the general way disclosed in U.S. Patent 2,268,586 and 2,292,443 to Gillman and Hanford, respectively, may be cured by the process of the present invention as well as the polyurethane polymers of Catlin U.S. Patent 2,284,637.

The linear condensation polymers of Carothers U.S. Patent 2,071,250, the polyether polymers of Rothrock U.S. Patent 2,292,406, the polyether polyamides of Christ and Hanford U.S. Patent 2,333,639 and the polyamides of U.S. Patents 2,071,250, 2,071,253 and 2,130,948 may also be cured by the process of the present invention. Other polymers and copolymers which may be cured by the process of the present invention are the homopolymers and copolymers of olefins such as those described in Belgian Patents 530,617; 535,082; 533,362; 538,782 and U.S. Patent 2,721,189.

Olefinic polymers and copolymers which may be treated by the process of the present invention are derived from conjugated diolefins. Representative polymers and copolymers which may be treated are natural rubber, copolymer of butadiene and isobutylene (commercially available as butyl rubber), polychloroprene (commercially available as neoprene), copolymer of butadiene and styrene (GRS or B), and a copolymer of butadiene and acrylonitrile (commercially available as "Hycar").

The free radical acceptors contemplated by the present invention are (1) bis-maleimides having the nitrogen atom substituted with an alkylene or arylene group, examples being (A) N,N'-methylene-bis-maleimide, (B) N,N'-ethylene-bis-maleimide, (C) N,N'-tetramethylene-bis-maleimide, (D) N,N'-hexamethylene-bis-maleimide, (E) N,N'-meta-phenylene-bis-maleimide, (F) N,N'-paraphenylene - bis - maleimide, (G) N,N' - naphthylene-bis-maleimide; (2) N-alkyl and aryl substituted maleimides, such as (A) N-methyl maleimide, (B) N-ethyl maleimide, (C) N-dodecyl maleimide, (D) N-stearyl maleimide, (E) N-phenyl maleimide, (F) N-naphthyl maleimide, (G) N-biphenyl maleimide, (H) N-dodecyl-phenyl maleimide; (3) bis-acrylamides having the nitrogens substituted with alkylene or arylene groups, such as (A) N,N'-methylene-bis-acrylamide, (B) N,N'-ethylene-bis-acrylamide, (C) N,N'-tetramethylene-bis-acrylamide, (D) N,N'-hexamethylene-bis-acrylamide, (E) N,N'-metaphenylene-bis-acrylamide, (F) N,N'-paraphenylene-bis-acrylamide, (G) N,N'-naphthalene-bis-acrylamide; and (4) cyclic trisacrylamide or triacryloyl-hexahydrotriazine.

The curing of the polymer of the present invention compounded with the defined free radical acceptor is effected by treatment with high energy radiation in the form of beta or gamma rays. The intensity and duration of the radiation may be varied. The radiation may be conveniently furnished by a Van der Graaf accelerator. The time of exposure will vary with the intensity and the greater the intensity the less time required for a given state of cure. There is usually an optimum exposure to develop the optimum properties in the cured polymer.

The polymers which are cured by the process of the present invention may be formed into sheets or films or fibers after incorporation of the free radical acceptor before radiating to cure. These shaped forms may be prepared by extruding the compounded stock through suitable dies. They may also be prepared by dissolving the compounded stock in a volatile solvent and laying down a layer of the solution and allowing the solvent to evaporate or extruding a concentrated solution through a spinneret and the solvent evaporated. The resulting films or fibers are then subjected to radiation to cure. The compounded stock may be formed into thin sheets on roller mills and the sheets taken off as unsupported films. If desired, the films may be calendered onto substrates and the composite radiated to cure the polymer.

Particularly useful films are made from olefin homopolymers or copolymers. These products are higher melting and have more solvent resistance than the uncured polymers. The cured polymers have a wide variety of uses including wrapping film, electrical insulation, etc.

The following examples illustrate the nature of the present invention; however, the invention is not intended to be limited to or by said examples. Parts are by weight unless otherwise indicated.

EXAMPLES

The compounded polymers of the present invention were cured by exposure to the ionizing radiation of a Van der Graaf accelerator; the extent of exposure is represented by the number of passes, 1 pass being equal to a dose of about $1 \times 10^6$ reps.

*Example 1*

100 parts of a commercially available polyethylene having a softening point of 96° C., a Shore hardness of 48 (D scale) and a stiffness of 32,000 lbs. per sq. in. is put on a rubber roll mill at 110–115° C. and milled to a smooth sheet. Then 5 parts of N-phenylmaleimide is milled in. The product is then sheeted off the mill at about 75 mils thickness. The compounded stock is placed in molds, covered with a sheet of aluminum foil and a sheet of polytetrafluoroethylene polymer (to form a smooth surface) and molded by heating in a hydraulic press at 120° C. for 15 minutes. The resultant polymer is in the form of slabs 1 inch by 5 inches and approximately 0.07 inch thick.

A similar set of slabs is made using 5 parts of methylene-bis-acrylamide per 100 parts of the polyethylene.

A control set is made without any additive.

The slabs are subjected to the beta radiation of a Van der Graaf accelerator, being placed on an endless band continuously passing through the beam. Each sample is passed through the beam 10 times for a total radiation dosage of about $1.5 \times 10^7$ reps.

Test strips of polyethylene, as compounded, are 2" long x 1/16" x 1/16" and are cut from the radiated samples. To the bottom of each strip is attached a 5-gram weight; these strips are then hung in an oven at 200° C. for 15 minutes and the thermal deformation thereof as percent elongation noted as shown in the following table:

Polymer:                       Percent elongation after irradiation
   (a) Polyethylene _____ 75
   (b) Polyethylene+5 parts N-phenyl-maleimide__ 37
   (c) Polyethylene+5 parts methylene-bis-acrylamide _____ 38

The marked decrease in elongation is indicative of the higher degree of cure effected when the polyethylene is compounded with a free radical acceptor and then subjected to radiation.

Copolymers of ethylene with propylene or other olefins show similar increases in state of cure when compounded with free radical acceptors of this invention prior to irradiation.

*Example 2*

A polyether-polyurethane elastomer is prepared as follows: 200 parts of polytetramethylene ether glycol of molecular weight 995 is placed in a Werner-Pfleiderer mixer with 24.0 parts of toluene-2,4-diisocyanate and mixed for 3 hours at 100° C. to form a polyurethane glycol. The mass is cooled to 70–75° C. and 0.39 part of water is added and mixed in for 15 minutes. Then 26.9 parts of toluene-2,4-diisocyanate is added and mixing at 70–75° C. is continued for 2 hours, after which 8.46 parts of water is added. Mixing is continued while the temperature rises to 98° C. The rubbery mass is removed to a rubber roll mill where 1.5 parts of piperidine is added as a stabilization agent and, after thorough mixing, the mass is sheeted off the rolls.

Then 100 parts of the stabilized polyurethane elastomer is milled on a rubber roll mill at 40–50° C. to form a smooth sheet and 30 parts of conductive channel black and 5 parts of triacryloylhexahydrotriazine are thoroughly milled in. The compounded stock is then sheeted off the mill.

"B." Slabs are formed in molds in a hydraulic press as described in Example 1.

"A." Another set of slabs is made from the polyurethane having only 30 parts of conductive channel black per 100 parts of polymer.

The slabs are then subjected to the beta radiation of a Van der Graaf accelerator, as above, for 10 passes or a total of $1.5 \times 10^7$ reps. dosage.

The modulus of the irradiated slabs is determined according to ASTM method D412–51T. The swelling effect of tetrahydrofuran as a solvent is determined by immersing disks of the samples cut from irradiated slabs and having diameters of 10 mm. in tetrahydrofuran at room temperature until the maximum swelling has taken place. The increase in volume of the disk is reported as volume percent swelling.

The results are shown in the following table:

| Elastomer Stock | Modulus 25° C. 300% Elongation Lbs. per sq. in. | Volume Percent Swelling |
|---|---|---|
| A | 1,015 | 836 |
| B | 1,680 | 378 |

In another experiment stocks A and B are subjected to 25 passes through the radiation. The modulus increases to 1430 lbs. per sq. in. for A and to 2370 lbs. per sq. in. for B.

In another experiment performed in the same way using GRS–1500 ("GR–S and GR–I Synthetic Rubbers," O.R.S., Washington, D.C., May 1, 1953) the following swelling data are obtained using toluene as the solvent.

Volume percent swelling
GR–S+carbon black _____ 980
GR–S+carbon black+1 part N,N'-m-phenylene-bis-maleimide _____ 700

This reduction in the volume percent swelling is indicative of the higher degree of curing effected by radiation in the presence of the free radical acceptor.

*Example 3*

100 parts of the polyurethane elastomer of Example 2 is compounded on a rubber roll mill with 3 parts of N,N'-m-phenylene-bis-maleimide and sheeted off the mill at a thickness of about 80 mils. Slabs of 1 x 5 x .075 inches are molded as described in Example 1 ("A").

A set of control slabs ("B") is made from the elastomer without addition of maleimide.

The slabs are then subjected to the beta rays of a Van der Graaf accelerator for 10 passes or a total dosage of $1.5 \times 10^7$ reps.

The modulus at 300% elongation is determined on for each stock. The modulus of the control, "B," is 380 lbs. per sq. in. while that of the stock, "A," containing N,N'-m-phenylene-bis-maleimide is 550 lbs. per sq. in. showing a considerably higher state of cure.

Example 4

A vinylidene fluoride-hexafluoropropene copolymer is made as follows:

A conditioned stainless steel pressure vessel is swept with nitrogen and charged with 125 parts of deoxygenated distilled water containing 0.16 part of ammonium persulfate, 0.03 part of sodium bisulfite and 0.33 part of disodium phosphate heptahydrate. The closed vessel is cooled to −80° C. and purged of oxygen by three alternate cycles of producing a vacuum in the vessel and then pressuring with oxygen-free nitrogen. The nitrogen is then removed, and, while the system is under reduced pressure, 35 parts each of gaseous hexafluoropropene and vinylidene fluoride is bled into the pressure vessel. The system is agitated and the temperature inside the reaction chamber raised to 100° C. over a 15-minute period. The autogenous pressure is observed to increase to about 700 p.s.i.g. which drops to 300 p.s.i.g. after two hours. After an additional heating period of twelve hours to ensure that the reaction is completed, the reaction mass is allowed to cool to room temperature and the pressure chamber vented to the atmosphere. The partially coagulated latex product is removed and coagulation completed by the addition of a small amount of dilute hydrochloric acid. The coagulated crumb is washed thoroughly with water and rolled on a hot rubber mill at about 140° C. to obtain 63 parts (90% conversion) of an off-white elastomer in rolled sheet form. Analysis of this elastomer for carbon, hydrogen and fluorine by combustion analysis indicates that the product copolymer contains about 45% hexafluoropropene and about 55% vinylidene fluoride by weight.

"A." 100 parts of the copolymer is banded on a rubber roll mill and 5 parts of zinc oxide, 17.5 parts of hydrophilic silica, 2.5 parts of low molecular weight silicone oil and 1 part of triacryloylhexahydrotriazine are thoroughly milled in. The compounded stock is then sheeted off the mill at a thickness of about 80 mils.

"B." A second stock is compounded as above, except that 5 parts of methylene-bis-acrylamide is substituted for the triacryloylhexahydrotriazine.

"C." A third stock is compounded as a control without amide or triazine.

Slabs are pressed as described in Example 1 and subjected to 10 passes through a Van der Graaf accelerator for a total dosage of beta rays of about $1.5 \times 10^7$ reps.

Modulus and percent swelling in acetone are determined for each set of samples with the following results:

| Compounded Stock | Modulus 25° C. 100% Elongation Lbs. per sq. in. | Volume Percent Swelling |
| --- | --- | --- |
| A | 430 | 292 |
| B | 800 | 160 |
| C | 230 | 700 |

The very significant increase in modulus and the marked decrease in volume of swelling in the acetone solvent show the unexpectedly high increase in the degree of cure when the free radical acceptors are combined with radiation in curing this elastomer.

The process of the present invention permits the curing of numerous high molecular weight polymers; said process effects a high degree of cure which could not have been achieved with ionizing radiation alone.

The term "rep" as comprehended in this invention refers to "roentgen equivalent physical." This term is used in scientific literature to designate "a measure of absorption" or the "absorbed dose." The definition can be found in "National Research Council Conference on Glossary of Terms in Nuclear Science and Technology," published by the American Society of Mechanical Engineers in 1955. It refers to that dose of radiation which produces energy absorption of 83 ergs per gram of tissue or 93 ergs per gram of tissue, depending upon whether reference is made to air or to water. Where reference is made based on the density of air, the value is 83; where reference is based on the density of water, the value is 93.

Many widely different embodiments of this invention may be made without departing from the spirit and scope thereof; it is to be understood that this invention is not limited to the specific embodiments thereof except as defined in the appended claims.

We claim:

1. A process of curing high molecular weight polymers which comprises compounding with said polymer, from about 0.5 to about 6% by weight of the polymer, a free radical acceptor selected from the group consisting of (1) N-substituted maleimides, (2) N,N'-alkylene bis-maleimides, (3) arylene bis-maleimides, (4) N,N'-alkylene bis-acrylamides, (5) arylene bis-acrylamides, and, (6) triacryloylhexahydrotriazine, followed by subjecting the compounded polymer to high energy ionizing radiation equivalent to at least 50 electron volts to effect a curing dosage of at least about $1 \times 10^6$ reps.

2. The process of claim 1 wherein the free radical acceptor is N-phenyl maleimide.

3. The process of claim 1 wherein the free radical acceptor is triacryloylhexahydrotriazine.

4. The process of claim 1 wherein the free radical acceptor is N,N'-m-phenylene-bis-maleimide.

5. The process of claim 1 wherein the polymer is cured in the form of a fiber.

6. The process of claim 1 wherein the polymer is cured in the form of a film.

7. The process of claim 1 wherein the polymer is cured in the form of a sheet.

8. The process of claim 1 wherein the polymer is cured in the form of a shaped article.

References Cited in the file of this patent

UNITED STATES PATENTS

| | | |
| --- | --- | --- |
| 2,301,356 | Arnold et al. | Nov. 10, 1942 |
| 2,475,846 | Lundberg | July 12, 1949 |

OTHER REFERENCES

Lawton et al.: "Nature," vol. 172, pp. 76 and 77, July 11, 1953.

Schildknecht: "Polymer Processes," vol. X, pp. 439–474, published by Interscience Pub. Inc., New York (1956).

Manowitz: "Nucleonics," pp. 18–20, October 1953, vol. 10.

Mesrobian et al.: "J. Chem. Phys.," vol. 22, pp. 565 and 566, March 1954.